United States Patent
Liu et al.

(10) Patent No.: US 11,570,824 B2
(45) Date of Patent: Jan. 31, 2023

(54) METHODS AND DEVICES FOR RANDOM ACCESS

(71) Applicant: Telefonaktiebolaget LM Ericsson (publ), Stockholm (SE)

(72) Inventors: Jinhua Liu, Beijing (CN); Min Wang, Luleå (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 17/290,581

(22) PCT Filed: Oct. 30, 2019

(86) PCT No.: PCT/CN2019/114255
§ 371 (c)(1),
(2) Date: Apr. 30, 2021

(87) PCT Pub. No.: WO2020/088498
PCT Pub. Date: May 7, 2020

(65) Prior Publication Data
US 2022/0007433 A1    Jan. 6, 2022

(30) Foreign Application Priority Data
Oct. 30, 2018  (WO) ................ PCT/CN2018/112718

(51) Int. Cl.
*H04W 74/08* (2009.01)
*H04W 28/02* (2009.01)
*H04W 80/02* (2009.01)

(52) U.S. Cl.
CPC ... *H04W 74/0841* (2013.01); *H04W 28/0268* (2013.01); *H04W 80/02* (2013.01)

(58) Field of Classification Search
CPC ......... H04W 74/0841; H04W 28/0268; H04W 80/02; H04W 74/0833
See application file for complete search history.

(56) References Cited

U.S. PATENT DOCUMENTS

| 2011/0305197 A1 | 12/2011 | Park et al. |
| 2012/0254890 A1* | 10/2012 | Li .......................... H04W 4/70 |
| | | 719/313 |

(Continued)

FOREIGN PATENT DOCUMENTS

| CN | 101742614 A | 6/2010 |
| CN | 102231917 A | 11/2011 |

(Continued)

OTHER PUBLICATIONS

Author Unknown, "Technical Specification Group Radio Access Network; NR; Medium Access Control (MAC) protocol specification (Release 15)," Technical Specification 38.321, Version 15.3.0, 3GPP Organizational Partners, Sep. 2018, 76 pages.

(Continued)

*Primary Examiner* — Harry H Kim
(74) *Attorney, Agent, or Firm* — Christopher & Weisberg, P.A.

(57) ABSTRACT

A method for a user equipment (UE) to perform random access to a radio network is provided. The method comprises: determining at least one message for random access indicating a cell where the UE initiates the random access and/or a purpose of the ransom access; and transmitting from the UE, the at least one message for random access to the radio network. A corresponding method for a base station, the corresponding devices, computer programs, and computer-readable storage are also provided.

24 Claims, 12 Drawing Sheets

(56) References Cited

U.S. PATENT DOCUMENTS

| | | | | |
|---|---|---|---|---|
| 2015/0011218 | A1* | 1/2015 | Lunden | H04W 48/20 |
| | | | | 455/445 |
| 2015/0359003 | A1* | 12/2015 | Kim | H04W 74/008 |
| | | | | 370/336 |
| 2017/0150529 | A1* | 5/2017 | Tan | H04W 76/27 |
| 2018/0324716 | A1* | 11/2018 | Jeon | H04W 74/0833 |
| 2019/0215877 | A1* | 7/2019 | Qian | H04L 27/2666 |
| 2019/0281635 | A1* | 9/2019 | Kwak | H04W 74/006 |
| 2020/0178306 | A1* | 6/2020 | Ohara | H04L 5/0048 |
| 2020/0337051 | A1* | 10/2020 | Chang | H04W 72/0453 |
| 2021/0153262 | A1* | 5/2021 | Mochizuki | H04W 56/0045 |
| 2021/0204209 | A1* | 7/2021 | Kim | H04W 8/24 |
| 2021/0344404 | A1* | 11/2021 | Matsumura | H04B 7/088 |

FOREIGN PATENT DOCUMENTS

| | | |
|---|---|---|
| EP | 3364589 A2 | 8/2018 |
| WO | 2011066797 A1 | 6/2011 |
| WO | 2014089831 A1 | 6/2014 |
| WO | 2015105353 A1 | 7/2015 |

OTHER PUBLICATIONS

International Search Report and Written Opinion for International Patent Application No. PCT/CN2019/114255, dated Feb. 1, 2020, 11 pages.

EPO Communication with Supplementary European Search Report dated Jun. 22, 2022 for Patent Application No. 19878187.4, consisting of 9-pages.

3GPP TSG-RAN WG2 Meeting 103 R2-1811210; Title: Remaining Issues of the New C-RNTI for Msg3 and Msg4; Agenda Item: 10.3.1.2; Source: CATT; Document for: Discussion and Decision; Date and Location: Aug. 20-24, 2018, Gothenburg, Sweden, consisting of 3-pages.

* cited by examiner

METHODS AND DEVICES FOR RANDOM ACCESS

This application is a 35 U.S.C. § 371 national phase filing of International Application No. PCT/CN2019/114255, filed Oct. 30, 2019, which claims the benefit of International Application No. PCT/CN2018/112718, filed Oct. 30, 2018, the disclosures of which are incorporated herein by reference in their entireties.

TECHNICAL FIELD

The present disclosure generally relates to the technical field of wireless communications, and particularly, to methods, devices, computer-readable storage and carrier for random access.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Next generation systems are expected to support a wide range of use cases with varying requirements ranging from fully mobile devices to stationary Internet of Things (IoT) or fixed wireless broadband devices. The traffic pattern associated with many use cases is expected to consist of short or long bursts of data traffic with varying length of waiting period in between (here called inactive state). In New Radio (NR), both license assisted access and standalone unlicensed operation are to be supported in Third Generation Partnership Project (3GPP). Hence the procedure of Physical Random Access Channel (PRACH) transmission and/or Scheduling Request (SR) transmission in unlicensed spectrum shall be investigated in 3GPP, where problems arise.

SUMMARY

It is objects of the present disclosure to address one or more of the problems arisen in random access in unlicensed spectrum.

According to one embodiment of the disclosure, there is provided a method for a user equipment, UE, to perform random access to a radio network, comprising: determining at least one message for random access indicating a cell where the UE initiates the random access and/or a purpose of the ransom access; and transmitting from the UE, the message for random access to the radio network.

According to a second embodiment of the disclosure, there is provided a method for a network device to control random access of one or more User Equipments, UEs, to a radio network, comprising: receiving from a UE at least one message for random access indicating a cell where the UE initiates the random access and/or a purpose of the random access; and determining the cell and/or purpose from the at least one message for random access.

According to a Third embodiment of the disclosure, there is provided a user equipment, UE, operative in a radio network, to perform random access to the radio network, comprising: a determining component configured to determine at least one message for random access indicating a cell where the UE initiates the random access and/or a purpose of the random access; and a transmitting component, configured to transmit the at least one message for random access to the radio network.

According to a fourth embodiment of the disclosure, there is provided a network device, operative in a radio network, to control random access of one or more User Equipments, UEs, to the radio network, comprising: a receiving component configured to receive, from a UE, at least one message for random access indicating a cell where the UE initiates the random access, and/or a purpose of the random access; a determining component, configured to determine the cell where the UE initiates the random access, and/or a purpose of the random access from the at least one message for random access.

According to a fifth embodiment of the disclosure, there is provided a communication device in a radio network, comprising: a storage adapted to store instructions therein and a processor adapted to execute the instructions to cause the communication device to perform the steps of any of the methods here.

According to a sixth embodiment of the disclosure, there is provided one or more computer-readable storage storing computer-executable instructions thereon, when executed by a computing device, causing the computing device to implement the method of any of any of the methods here.

According to a seventh embodiment of the disclosure, there is provided a device adapted to perform any of the methods here.

According to a eighth embodiment of the disclosure, there is provided a computer program, comprising instructions which, when executed on at least one processor, cause the at least one processor to carry out the method according to any one of the methods here.

According to a ninth embodiment of the disclosure, there is provided a carrier containing the computer program of the eighth embodiment, wherein the carrier is one of an electronic signal, optical signal, radio signal, or computer readable storage.

According to a tenth embodiment of the disclosure, there is provided a communication system including a host computer comprising: a communication interface configured to receive user data originating from a transmission from a user equipment, UE, to a base station, BS, wherein the UE comprises a radio interface and processing circuitry, the UE's processing circuitry configured to: determine at least one message for random access indicating a cell where the UE initiates the random access and/or a purpose of the ransom access; and transmit, from the UE, the at least one message for random access to the BS.

According to a eleventh embodiment of the disclosure, there is provided a method implemented in a communication system including a host computer, a base station, BS, and a user equipment, UE, the method comprising: at the host computer, receiving user data transmitted to the base station from the UE, wherein the UE: determines at least one message for random access indicating a cell where the UE initiates the random access and/or a purpose of the ransom access; and transmits, from the UE, the at least one message for random access to the BS.

According to a twelfth embodiment of the disclosure, there is provided a communication system including a host computer comprising a communication interface configured to receive user data originating from a transmission from a user equipment, UE, to a base station, BS, wherein the BS comprises a radio interface and processing circuitry, the BS's processing circuitry configured to: receive from a UE, at least one message for random access indicating a cell where the UE initiates the random access and/or a purpose of the random access; and determine the cell and/or purpose from the at least one message for random access.

According to a tenth embodiment of the disclosure, there is provided a method implemented in a communication system including a host computer, a base station, BS, and a user equipment, UE, the method comprising: at the host computer, receiving, from the BS, user data originating from a transmission which the BS has received from the UE, wherein the UE: determines at least one message for random access indicating a cell where the UE: initiates the random access and/or a purpose of the ransom access; and transmits, from the UE, the at least one message for random access to the BS.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and details through use of the accompanying drawings.

DETAILED DESCRIPTION

Figure 1:
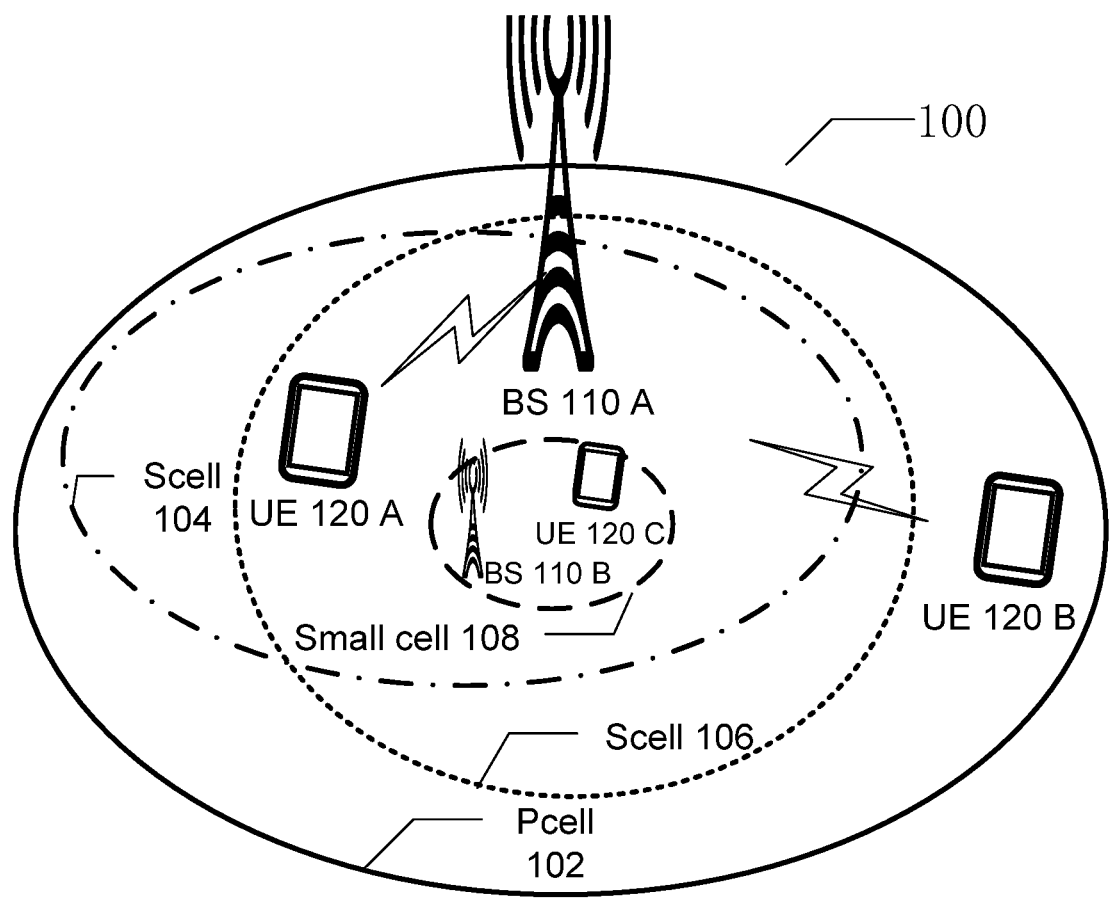
FIG. 1 illustrates coverage differences between a NR UL carrier and a SUL carrier.

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein, for example, "preamble" should be construed as "random access preamble" herein.

In order to tackle with the ever increasing data demanding, NR is considered in both licensed and unlicensed spectrum (NR-U). Compared to the LTE License Assisted Access (LAA), NR-U also needs to support Dual-Connectivity (DC) and standalone scenarios, where the Media Access Control (MAC) procedures including Random Access Channel (RACH) and scheduling procedure on unlicensed spectrum are subject to the Listen Before Talk (LBT) failures, while there was no such a restriction in LTE LAA, since there was licensed spectrum in LAA scenario so the RACH and scheduling related signaling can be transmitted on the licensed spectrum instead of unlicensed spectrum.

The Radio Resource Management (RRM) procedures in NR-U would be generally rather similar as in LAA, since NR-U is aiming to reuse LAA/eLAA/feLAA technologies as much as possible to handle the coexistence between NR-U and other legacy Radio Access Technologies (RATs). Channel access/selection for LAA was one of important aspects for co-existence with other RATs such as Wi-Fi. For instance, LAA has aimed to use carriers that are congested with Wi-Fi. Therefore, RRM measurements as one critical aspect has been designed are critical for the congestion avoidance purpose.

In licensed spectrum, UE measures Reference Signal Received Power (RSRP), and Reference Signal Received Quality (RSRQ) of the downlink radio channel, and provides the measurement reports to its serving eNB/gNB. However, they don't reflect the interference strength on the carrier. Another metric Received Signal Strength Indicator (RSSI) can serve for such a purpose. At the eNB/gNB side, it is possible to derive RSSI based on the received RSRP and RSRQ reports, however, this requires that they must be available. Due to the LBT failure, some reports in terms of RSRP or RSRP may be blocked (can be either due to that the reference signal transmission is blocked in the downlink or the measurement report is blocked in the uplink). Hence, the measurements in terms of RSSI are very useful. The RSSI measurements together with the time information concerning when and how long time that UEs have made the measurements can assist the gNB/eNB to detect the hidden node. Additionally, the gNB/eNB can measure the load situation of the carrier which is useful for the network to prioritize some channels for load balance and channel access failure avoidance purposes.

LTE LAA has defined to support measurements of averaged RSSI and channel occupancy for measurement reports. The channel occupancy is defined as percentage of time that RSSI was measured above a configured threshold. For this purpose, a RSSI measurement timing configuration (RMTC) includes a measurement duration (e.g. 1-5 ms) and a period between measurements (e.g. {40, 80, 160, 320, 640} ms).

LBT is designed for unlicensed spectrum co-existence with other RATs. In this mechanism, a radio device applies a clear channel assessment (CCA) check before any transmission. The transmitter involves energy detection (ED) over a time period compared to a certain threshold (i.e., ED threshold) in order to determine if a channel is idle. In case the channel is determined to be occupied, the transmitter performs a random back-off within a contention window before next CCA attempt. In order to protect the ACK transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time (MCOT)). For Quality of Control (QoS) differentiation, a channel access priority based on the service type has been defined. For example, there are four LBT priority classes defined for differentiation of contention window sizes (CWS) and MCOT between services.

The ordinary four step Radio Access (RA) has been the current standard for legacy systems such as LTE. It has been proposed to study a two-step procedure where the UL messages (PRACH and MSG3) are sent simultaneously and similarly the two DL messages (e.g. time advance command in RAR and contention resolution information) are sent as a simultaneous response in the DL. In the legacy four step procedure, one of the main usage of the first two messages is to obtain UL time alignment for the UE. In many situations, e.g. in small cells or for stationary UEs, this may not be needed since either a TA=0 will be sufficient (small cells) or a stored TA value from the last RA could serve also for the current RA (stationary UE). In future radio networks it can be expected that these situations are common, both due to dense deployments of small cells and a great number of e.g. stationary IoT devices. A possibility to skip the message exchange to obtain the TA value would lead to reduced RA latency and would be beneficial in several use cases, for example when transmitting infrequent small data packets. On the other hand, the two step RA will consume more resources since it uses contention based transmission of the data. This means that the resources that are configured for the data may often be unused.

If both the four-step and two-step RA are configured in a cell (and for the UE), the UE will choose a preamble from one specific set if it wants to do a four-step RA, and from another set if it wants to do a two-step RA. Hence a preamble partition is done to distinguish between the four-step and two-step RA.

Figure 2:
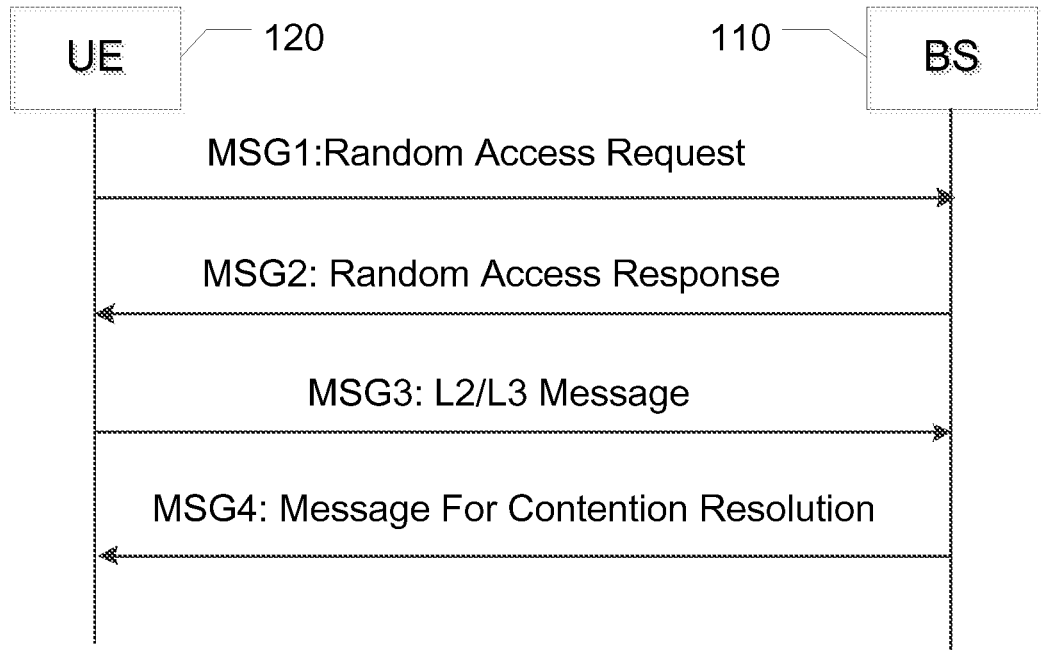
FIG. 2 illustrates a 4-step contention-based random access procedure.

The legacy 4-step RA has been used in LTE and is also proposed as baseline for NR. The principle of this procedure is shown in FIG. 2. FIG. 2 illustrates a legacy 4-step random access procedure, which consists of the following four steps:

Step 1: Random access preamble transmission (MSG1);
Step 2: Random access response (MSG2);
Step 3: Layer 2/Layer 3 (L2/L3) message (MSG3);
Step 4: Contention resolution message (MSG4).

What is shown in FIG. 2 is a contention-based random access procedure, while the conventional contention-free random access procedure is similar to that except for Step 4.

In the contention-based random access procedure, at Step 1, the UE selects one of preambles available in the contention-based random access procedure, e.g., 64-Ncf as specified, where Ncf is the number of preambles reserved by the eNB for contention-free random access. Preambles available in the contention-based random access procedure are further subdivided into two subgroups of group A and group B so that the choice of a preamble can carry one bit of information relating to the amount of transmission resource needed to transmit MSG3. Broadcast system information indicates which preambles are in each of the two subgroups (each subgroup corresponding to one value of the one bit of information), as well as the meaning of each subgroup. The UE selects a preamble from one subgroup corresponding to the size of transmission resources needed for the appropriate RACH use case. Some use cases require only a few bits to be transmitted in MSG3, so choosing a smaller message size avoids allocating unnecessary uplink resources.

Once detecting the preamble in a time-frequency slot, the eNB determines an ID, e.g. RA-RNTI, identifying the time-frequency slot in which the preamble was detected, estimates the Timing alignment (TA) the UE should use in order to obtain UL synch at the eNB. Then, at Step 2, the eNB sends a Random Access Response (RAR) addressed with the ID on the Physical Downlink Shared CHannel (PDSCH). If multiple UEs had collided by selecting the same preamble in the same preamble time-frequency resource, they would each receive the RAR.

The RAR conveys the identity of the detected preamble, i.e., RAPID, a timing alignment instruction to synchronize subsequent uplink transmissions from the UE, an initial uplink resource grant for transmission of the Step 3 message, and an assignment of a temporary Cell Radio Network Temporary Identifier (C-RNTI) (which may or may not be made permanent as a result of the next step—contention resolution). The RAR is scrambled with the RA-RNTI and indicates the PRACH resource on which the preamble was transmitted. The UE expects to receive the RAR within a time window, of which the start and end are configured by the eNodeB and broadcast as part of the cell-specific system information. If the UE does not receive an RAR within the configured time window, it selects another preamble to be transmitted again.

Once the preamble is transmitted and regardless of the possible occurrence of a measurement gap, the UE will monitor the Physical Downlink Control Channel (PDCCH) for RAR(s) identified by the RA-RNTI defined below within the time window.

At Step 3, the UE transmits a Layer 2/Layer 3 (L2/L3) Message to the eNB by using a resource indicated by the RAR. This message is the first scheduled uplink transmission on the PUSCH and makes use of Hybrid Automatic Repeat reQuest (HARQ). It conveys the actual random access procedure message, such as a Radio Resource Control (RRC) connection request, tracking area update, or scheduling request. It includes a C-RNTI allocated in the RAR at Step 2 and either the C-RNTI if the UE already has one (RRC_CONNECTED UEs) or the (unique) 48-bit UE identity. In case of a preamble collision occurring at Step 1, the colliding UEs will receive the same Temporary C-RNTI through the RAR and will also collide in the same uplink time-frequency resources when transmitting their L2/L3 messages. This may result in such interferences that no colliding UEs can be decoded, and the UEs restart the random access procedure after reaching the maximum number of HARQ retransmissions. However, if one UE is successfully decoded, the contention remains unresolved for the other UE. The following downlink message (in step 4) allows a quick resolution of the contention.

At step 4, the eNB transmits a contention resolution message to the UE. This message is the first scheduled uplink transmission on the PUSCH and makes use of HARQ. It is addressed to the C-RNTI (if indicated in the MSG3) or to the temporary C-RNTI, and, in the latter case, echoes the UE identity contained in MSG3. In case of a collision followed by successful decoding of the MSG3, the HARQ feedback is transmitted only by the UE which detects its own UE identity (or C-RNTI); other colliding UE(s) understand there was a collision, transmit no HARQ feedback, and can quickly exit the current random access procedure and start another one.

In LTE, the 4-step RA cannot be completed in less than 14 ms/TTI/SF.

Figure 3:
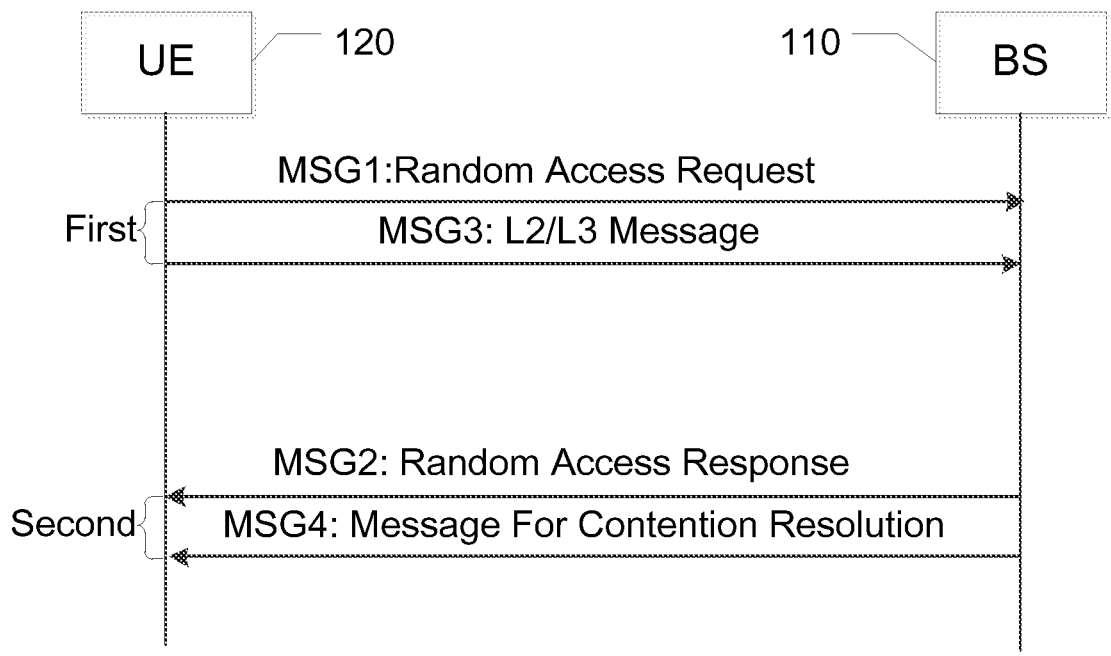
FIG. 3 illustrates a 2-step contention-based random access procedure.

The 2-step RA gives much shorter latency than the ordinary 4-step RA. As shown in FIG. 3, in the 2-step RA the preamble and a message corresponding to MSG3 in the 4-step RA are transmitted in the same sub frame or in two subsequent sub frames as a first message, which is also referred to as message A in some references. The MSG3 is sent on a resource dedicated to the specific preamble. This means that both the preamble and the MSG3 face contention but contention resolution in this case means that either both preamble and MSG3 are sent without collision or both collide.

Upon successful reception of the preamble and MSG3, the eNB will respond with a TA (which by assumption should not be needed or just give very minor updates) and a MSG4 for contention resolution in the same sub frame or subsequent sub frames as a second message, which is also referred to as message B in some references.

An issue that may occur if the UE TA is bad (e.g. using TA=0 in a large cell or using an old TA even though the UE has moved) is that only the preamble can be detected by the eNB. Because a transmission with an inaccurate TA value may interfere transmissions from other UEs in the same cell. Additionally, the preamble signal has higher detection probability than the normal data due to its design pattern. In this case the NW may reply with an ordinary RAR giving the UE an opportunity to transmit an ordinary MSG3 on a scheduled resource. This is a fallback to 4-step RA.

In NR licensed, both Contention Based Random Access (CBRA) and Contention Free Random Access (CFRA) are supported in the primary cell. It is only CFRA that is allowed in an Secondary Cell (SCell). In addition, an RAR message is only transmitted in the Primary Cell (PCell). It is mainly due to the restriction of PDCCH search space. The common PDCCH search space is only configured in the primary cell.

However, in NR-U, it is beneficial to allow the UE to transmit an RA (both CBRA and CFRA) on any active serving cell to gain additional RA opportunities. Allowing a UE to perform CBRA on an SCell is motivated by several aspects. One example is a PUCCH SR failure may be triggered by LBT failure in one serving cell. In this case, the UE has reached the maximum PUCCH SR attempts while the UE has not received a UL grant. In NR-U, it may be more often for a UE to occur PUCCH-SR failures due to LBT failure, meaning that it may be more often to trigger RA-SRs than in NR licensed cells. Therefore, it is reasonable for the UE to transmit a CBRA on SCells to gain more RA opportunities. Another example is a CFRA triggered by a PDCCH order may be blocked by LBT failures in an SCell so that the UE misses the scheduled RA occasion. It would be helpful if the UE is allowed to fallback to CBRA in the same or in a different SCell. The UE then has more chances for that RA to get through. Yet another example is in case the UE may be subject to LBT for a CBRA BFR RA in the primary cell, the UE can send the RA in other serving cell to achieve a fast recovery for the beam failure. In order to do this, the PRACH configuration/resources need to be configured on a secondary serving cell (or optionally a subset of serving cells).

Whenever an RA is triggered, the UE may perform LBT on multiple serving cells and select a cell with a successful LBT to transmit MSG1. After transmission of MSG1, the UE or the gNB may experience LBT failures for subsequent messages in this RA procedure. It would give best flexibility if we allow these messages are transmitted across different cells in a cell group.

In LTE LAA/eLAA/feLAA, there is no standalone unlicensed spectrum scenario, meaning that the UE doesn't need to support RACH and PUCCH-SR transmissions in the unlicensed spectrum cells as secondary cells, since they can basically be transmitted over the licensed spectrum cells as primary cells.

Regarding NR unlicensed access, NR unlicensed operation need to support both standalone and DC scenarios meaning that both RACH and PUCCH-SR signaling need to be transmitted over unlicensed spectrum cells, since a NR-U cell may operate as a primary cell.

As described above, NR-U UE may be able to perform an RA procedure across cells/carriers to gain additional RA opportunities. It is a reasonable assumption since the UE MAC maintains only one RA procedure at a time, so that the UE can figure out which RA procedure (and the associated RA purpose) upon reception of an RA message/transmission of an RA message on any active serving cell. In this way, we expect the UE can gain the best flexibility to compensate missed RA opportunities due to LBT failures.

However, there is a potential risk for the gNB to misinterpret/or be not able to interpret the RA purpose for a received RA message which is intended/triggered by an RA event in another cell since the gNB in a cell may receive both RA messages from its own cell and other cells for providing additional RA opportunity purpose. It is vitally important for the gNB to correctly decode/interpret the received RA message so that the gNB is able to correctly/suitable react to UE requests.

In the existing RA procedure, we have seen several gaps in order to support a cross-carrier/cell RA procedure for unlicensed spectrum scenarios.

The first gap is the existing RA procedure doesn't identify the cell. When a cell receives an RA message intended for RA event triggered in another cell according to LBT results, the cell must identify the cell which the RA message is triggered. The cell can forward the RA messages/requests to the cell in which the RA is triggered. If possible (meaning that gNB has available RA opportunity after the LBT operation), that cell can reply with the DL RA message to complete the RA procedure. For specific RA event, such as RA triggered for scheduling request (also referred to as RA-SR), the cell that has triggered the corresponding RA event must be known by the receiving cell. Since the cell that has triggered the RA event must take the proper actions upon reception of the RA message, for instance, RA-SR is triggered in a cell since the PUCCH-SR in that cell has reached the maximum transmission attempts, meaning that the associated PUCCH-SR resources may not be available/usable anymore, that cell may need to reconfigure PUCCH-SR resources for that UE in the cell.

The second gap is that the existing CBRA procedure doesn't identify an RA purpose. In the existing CBRA procedure, the UE randomly selects a preamble to transmit on PRACH. The gNB may not be able to identify the RA purpose upon reception of the preamble. The gNB may have to rely on reception of MSG3 to identify/interpret the RA purpose so that the gNB may reply with a proper Message in DL. However, for an RA event such as RA-SR, the UE would just transmit a C-RNTI MAC Control Element (CE) in MSG3, there is no RRC message carried/included in MSG3, the gNB can not identify the RA purpose. So, the gNB can not reconfigure PUCCH-SR resource in time. In case a cross-carrier/cell RA is received at a cell, this issue becomes more problematic since this increases the complexity for the gNB to identify the RA purpose especially when the gNB may receive RA messages using the same preamble from both its own cell, and also from another cell.

FIG. 1 schematically shows a networking environment in which embodiments of the present disclosure are employed. There is an NR compliant UE 120 A that is in communication with a primary cell (PCell) 102 and with two secondary cells (SCells) 104 and 106, each cell overlapping but not necessarily covering the same geographic area, in a carrier aggregation scenario. By way of example, and with reference to 3GPP, the NR compliant UE 120 can communicate with the Base Station 110 A (e.g., in the DL or the UL), which can have radio frequency transmission and reception equipment for providing radio coverage via three distinct radio frequency resources (also referred to as carriers) F1, F2, and F3. The three carriers can be used as individual component carriers (CC) for communication that can be provided to UE 120 A in aggregate, e.g., to offer higher communication bandwidth and/or throughput than can be possible using only a single component carrier. From the perspective of the NR compliant UE 120 A, the CC radio frequency resource F1 can be associated with the primary cell 102, the CC radio frequency resource F2 can be associated with the secondary cell 104, and the CC radio frequency resource F3 can be associated with the secondary cell 106.

The networking environment 100 also depicts an LTE compliant UE 120 B, with reference to 3GPP LTE Releases 8 and 9, which is not capable of communicating using carrier aggregation with multiple component carriers but can communicate in accordance with a legacy LTE radio communication protocol using one component carrier, e.g., the primary component carrier. By way of example, the LTE compliant UE 120 B can communicate with the BS 110 A (in the DL or the UL) via a single frequency resource F1. The networking environment 100 also depicts an LTE compliant UE 120 C, which operates in accordance with an LTE radio communication protocol (e.g., 3GPP LTE Releases 8/9 or later) and can connect to a radio network via a single frequency resource, which can be associated with a "small" cell 108, i.e., a cell having a geographic coverage range that is less than that of a usual "macro" cell for a radio network. In some embodiments, the "small" cell 108 can be also referred to as a micro-cell, nano-cell, or femto-cell, which can provide limited coverage that supplements coverage provided by a macro cell, e.g., by the primary cell 102, of a cellular radio network. The "small" cell 108 can emanate from dedicated network equipment 110 B, which can be connected to the radio network via a "back haul" using either a wired or wireless connection. In some embodiments, the "small" cell 108 connects to the radio network via a wired connection (e.g., through a "broadband" link). A radio network provider can offer services for a "home" based "small cell" that provides short range coverage within a limited area to supplement service provided by one or more macro cells of the cellular radio network. Radio network providers can seek to use multiple parallel connection options in order to balance network loading and provide for greater coverage, higher data rates, and/or greater link stability using a combination of "macro" cells and "small" cells. In some embodiments, a radio network provider can operate the "small" cell 108 using a carrier in a licensed radio frequency band, e.g., via frequency resource F4. In some embodiments, the radio network provider can operate the "small" cell 108 using a secondary component carrier in an unlicensed radio frequency band (referred to as NR-U), e.g., via frequency resource F5 to supplement communication via a primary component carrier in a licensed radio frequency band. An NR-U capable radio communication network device which operates in accordance with an NR-U radio communication protocol would be able to connect to the radio network using both the primary carrier in a licensed radio frequency band, e.g., via frequency resource F1, and the secondary carrier in an unlicensed radio frequency band, e.g., via frequency resource F5 in parallel via carrier aggregation. As unlicensed radio frequency bands can be shared by multiple network providers and/or by a variety of wireless communication network devices, the NR-U communication via the secondary component carrier F5 in the small cell (also referred to as the secondary cell) 108 can be "managed" by the BS 110 B to mitigate interference into and received from other wireless communication network devices, e.g., Wi-Fi devices.

In the present disclosure, the UE may be a communication device also known as a mobile terminal, and/or a wireless terminal, which is enabled to communicate wirelessly with a transmitter in a radio network, sometimes also referred to as a cellular radio system. For instance, a communication device may be, but not limited to, a mobile phone, a smart phone, a sensor device, a meter, a vehicle, a household appliance, a medical appliance, a media player, a camera, or any type of consumer electronic, for instance, but not limited to, a television, a radio, a lighting arrangement, a tablet computer, a laptop, or a Personal Computer (PC). The communication device may be a portable, pocket-storable, hand-held, computer-comprised, or vehicle-mounted mobile device, enabled to communicate voice and/or data, via a wireless connection.

In the following descriptions, details similar to those described above with reference to FIGS. 2 and 3 will not be discussed. Efforts are made to elucidate new points over prior art.

The following embodiments with reference to the following figures are described mainly in the context of a New Radio unlicensed spectrum (NR-U), or NR-U compatible with legacy LTE technology. However, it is understood that the embodiments are not limited to NR-U scenarios and are applicable to other appropriate networks, for example, unlicensed operation scenarios, such as LTE LAA/eLAA/Fe-LAA as appropriate.

Figure 4A:
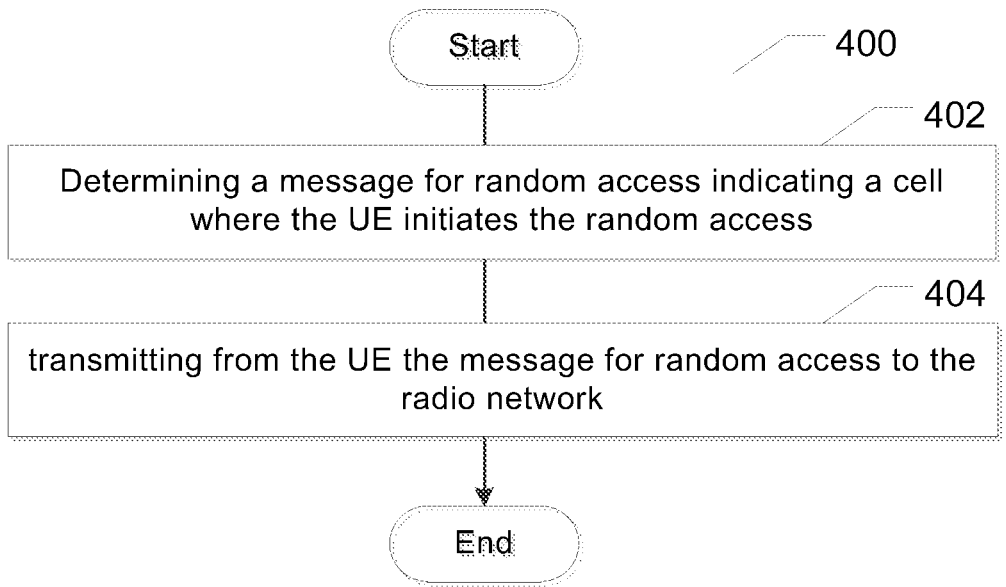
FIG. 4a illustrates a flowchart of a method 400 used in a UE for performing random access to a radio network according to embodiments of the present disclosure.

FIG. 4a shows a flowchart of a method 400 used in a UE for performing random access to a radio network according to embodiments of the present disclosure. The radio network is e.g., a 5G network as shown in FIG. 1, or any other appropriate radio network.

The method starts at step 402, in which the UE 120 determines a message for random access indicating a cell where the UE 120 initiates the random access. Then at step 404, the UE 120 transmits the message for random access to the radio network, such as its serving cell or cells in its cell group.

In some embodiments, the indicator indicating the cell is carried in a newly defined field of a legacy message for random access or a MAC CE. For example, the newly defined field is a new MAC CE, and the legacy message can be one of MSG3 in the 4-step random access procedure and the first message in the 2-step random access procedure. In some examples, the indicator comprises one of: a physical layer cell ID, a global cell ID, or a local cell index in a cell group, such as carrier index in a CC group that can be used to indicate a respective cell in a Carrier Access (CA) cell group. In some examples, the indicator is an index of PRACH configuration dedicated for the cell, which requires that each cell is assigned a separate PRACH configuration with a respective index.

In some scenarios of these embodiments, the random access is initiated in a secondary cell. As in CA technology, the primary cell is responsible for radio resource control. In case that the UE 120 expects the secondary cell to respond to the message for random access, some MAC CE or RRC signaling procedure is needed to inform the secondary cell of relevant information of the primary cell such as its physical layer cell ID, a global cell ID, or a local cell index in a cell group, such as carrier index in a CC group that can be used to indicate a respective cell in a CA cell group. While in case that the UE 120 expects to receive the response to the message for random access from the primary cell, the secondary cell may need to forward the message for random access to the primary cell and forward the response to the message for random access from the primary cell to the UE.

In some embodiments, the message for random access comprises a preamble dedicated for the cell to indicate the cell. In some embodiments, the message for random access is transmitted on a PRACH resource dedicated for the cell to indicate the cell. In some further embodiments, the preamble is dedicated for a purpose of the random access to indicate the purpose of the random access. In some further embodiments, the PRACH resource is dedicated for a purpose of the random access to indicate the purpose of the random access.

In these embodiment, the PRACH preambles or PRACH resources (in both frequency and time domain) may be split among all configured serving cells e.g. in a CA scenario to indicate the cell where the RA procedure initiates. This means that a different serving cell is allocated with a dedicated PRACH preamble or PRACH resource partition, compared to another serving cell. The UE 120 shall select a PRACH preamble according to the cell where the RA initiates. For PRACH monitoring in the BS 110, a cell shall monitor all PRACH preambles regardless of the PRACH preamble dedication. Upon reception of the first RA message in an RA procedure, e.g. MSG1 in 4-step RA or the first message in 2-step RA, the BS 110 can understand which cell the RA request is from according to the predefined mapping between PRACH preambles and cells.

Additionally, for each cell, additional partitions of PRACH preamble or PRACH resources may be defined for different RA purposes. Upon reception of the first RA message in an RA procedure, the BS 110 can identify both the cell where the RA initiates and the RA purpose that the RA event is intended for. It will be conceived by one skilled in the art that a dedicated PRACH preamble may be used to indicate not only the cell but also the purpose that the RA event is intended for, or a dedicated PRACH resource may be used to indicate not only the cell but also the purpose that the RA event is intended for. It will also be conceived by one skilled in the art that a dedicated PRACH preamble may be used to indicate the cell only while a dedicated preamble resource is used to indicate the purpose that the RA event is intended for, or vice versa.

In some embodiments, the cell is indicated in an RRC message comprised in the message for random access. In some further embodiments, the purpose of the random access is also indicated in the RRC message. Accordingly, the RRC message may define one or multiple new information elements for the added information as described above.

For RA events triggered in connected mode, such as UL sync (since the UE may lose the UL sync), or beam failure recovery, their MSG3 doesn't carry an RRC message. Therefore, it is advantageous to indicate the purpose of random access to help the cell to improve network performance.

In some embodiments, the message for random access further indicates one or more of the following: QoS parameter on service type (such as uRLLC), on access category and on access class for the cell to adapt the RA appropriately.

Steps of the embodiment may be mixed as appropriate, for example, the embodiments where the cell is carried in a newly defined field may be combined with the embodiments where the purpose is indicated in the RRC message, as long as they may be carried in the same message. Otherwise, more than one message may be needed.

Figure 4B:
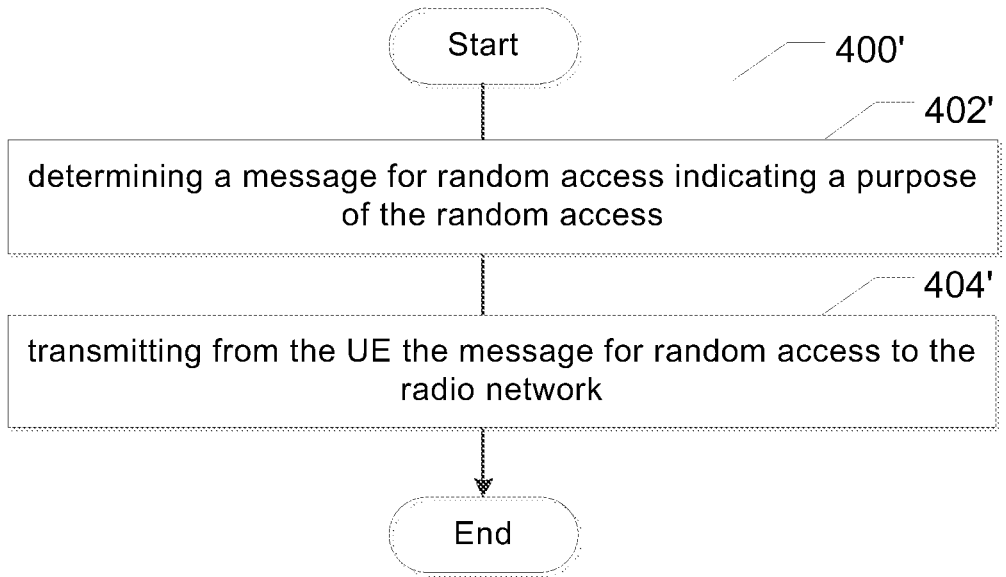
FIG. 4b illustrates a flowchart of a method 400' used in a UE for performing random access to a radio network according to embodiments of the present disclosure.

FIG. 4b shows a flowchart of a method 400' used in a UE for performing random access to a radio network according to embodiments of the present disclosure. The radio network is e.g., a 5G network as shown in FIG. 1, or any other appropriate radio network.

The method starts at step 402', in which the UE 120 determines a message for random access indicating a purpose of the random access. Then at step 404', the UE 120 transmits the message for random access to the radio network, such as its serving cell or cells in its cell group.

In some embodiments, some available R bits in MAC subheader is used to carry the index that is used to indicate the triggering event, i.e., the purpose of the RA.

There are two R bits in the MAC subheader illustrated in 3GPP TS 38.321-f30, for example, for C-RNTI MAC which has fixed SDU length, this subheader format is used. The two R bits can be used to indicate at least 4 RA events, or the purposes can be divided to into 4 groups and each value indicates one group. One can also only use 3 out of 4 values to indicate the RA events with the rest one value defined as a default value to be compatible with legacy LTE. In this case, only 3 RA events or RA event groups can be indicated.

The embodiments described with reference to FIG. 4a may be applied similarly to the solution of FIG. 4b as appropriate. For example, the purpose may also be indicated in newly defined field in MSG3 of the 4-step random access or the first message in 2-step random access, or indicated in an RRC message comprised in MSG3, etc., or further in combination with the QoS parameter(s) mentioned above. As a whole or by scenario, with the message for random access indicating the cell, NR-U UE is able to perform an RA procedure across cells/carriers to gain additional RA opportunities. Additionally or alternatively, as the CBRA procedure may be able to identify an RA purpose for the BS, proper actions may be taken, such as reconfiguring PUCCH-SR resources for the UE in the cell upon reception of the message for RA in a RA-SR event, and thus cell configuration improvement may be supported by the UE. Thereby, benefits such as reduced user waiting time, and better responsiveness is provided.

Figure 5A:
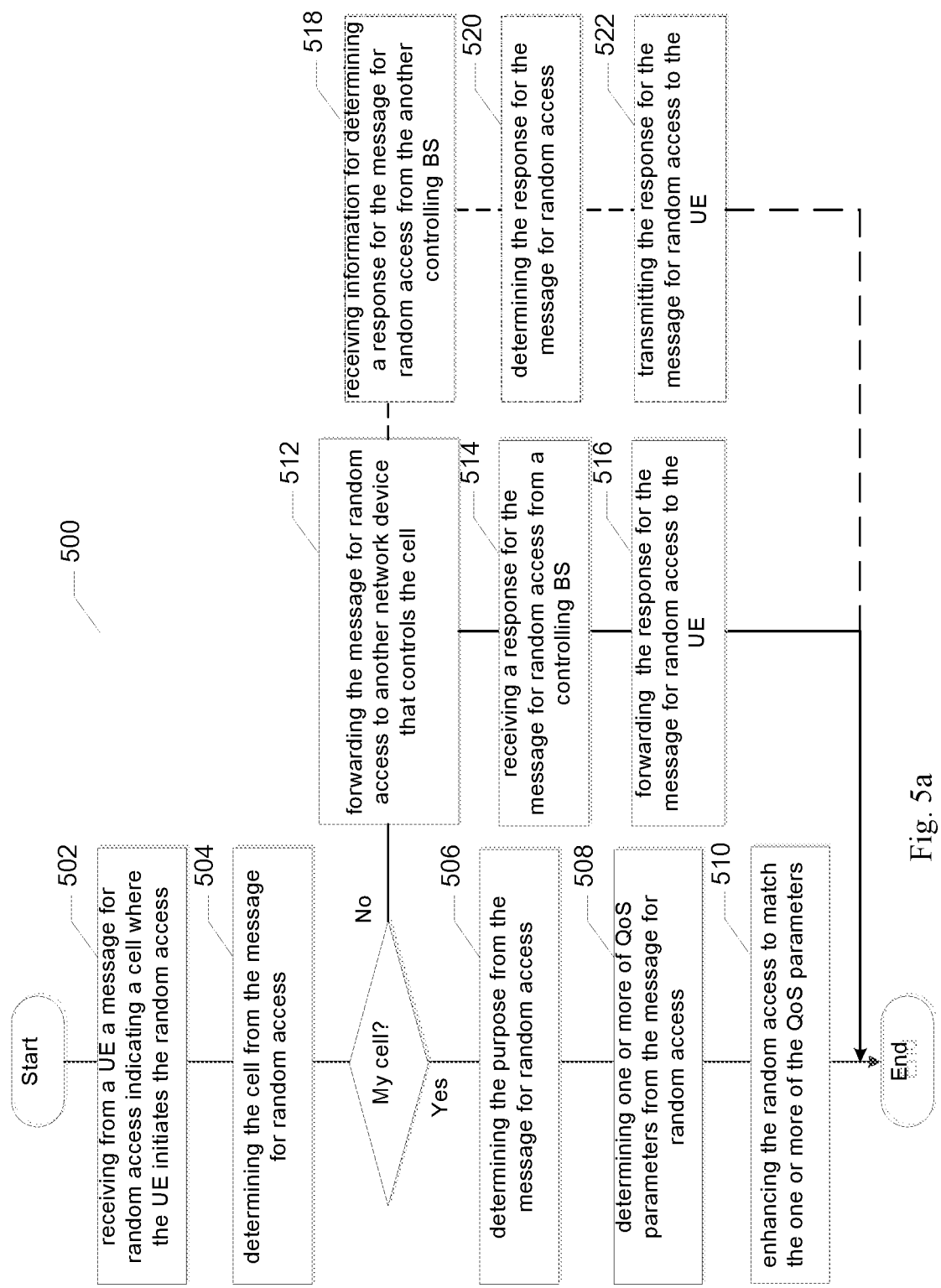
FIG. 5a illustrates a flowchart of a method 500 used in a BS for controlling random access of one or more UEs to a radio network according to embodiments of the present disclosure.

FIG. 5a shows a flowchart of a method 500 used in a BS for controlling random access of one or more user equipments to a radio network according to embodiments of the present disclosure. The network here may be a 5G network, or any other appropriate radio network.

The method starts at step 502, in which the BS 110 receives from a UE 120 a message for random access indicating a cell where the UE 120 initiates the random access. Then at step 504, the BS 110 determines the cell from the message for random access.

If it is the BS's own cell, it may proceed to step 506 to determine the purpose from the message for random access, if indicated, and in a further embodiment proceed to step 508 to determine one or more of QoS parameters from the message for random access, if indicated, and in response in step 510, to enhance the random access to match the one or more of the QoS parameters.

If it is not the BS's own cell, it will proceed to step 512 to forward the message for random access to another BS that controls the cell.

In some embodiments, the BS 110 may receive a response for the message for random access from a controlling BS at step 514 and forward it to the UE 120 at step 516.

In some embodiments, the BS 110 may receive information for determining a response for the message for random access from the controlling BS at step 518, with which the response for the message for random access can be determined at step 520 and transmitted to the UE 120 at step 522.

The determining step 504, 506 and 508 corresponds with the indicating embodiments described with reference to FIG. 4a. When the information is indicated in an RRC message, the information will be determined from the RRC message, and so on.

Figure 5B:
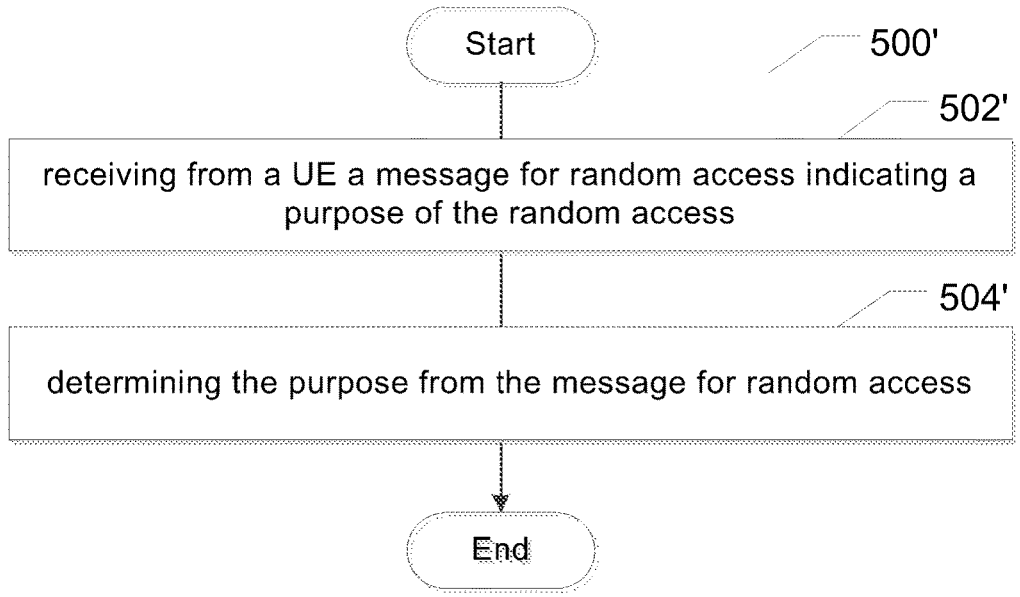
FIG. 5b illustrates a flowchart of a method 500 used in a BS for controlling random access of one or more UEs to a radio network according to embodiments of the present disclosure.

FIG. 5b shows a flowchart of a method 500' used in a BS for controlling random access of one or more user equipments to a radio network according to embodiments of the present disclosure. The network here may be a 5G network, or any other appropriate radio network.

The method starts at step 502', in which the BS 110 receives from a UE 120 a message for random access indicating a purpose of the random access. Then at step 504', the BS 110 determines the purpose of the random access from the message for random access.

In some embodiments, the purpose is determined from some available R bits in MAC subheader used to carry the index that is used to indicate the triggering event, i.e., the purpose of the RA.

The embodiments described with reference to FIG. 5a may be applied similarly to the solution of FIG. 5b as appropriate. For example, the purpose may also be determined from a newly defined field in MSG3 in 4-step random access or the first message in 2-step random access, or from an RRC message comprised in MSG3, etc., or further in combination with steps 508 and 510 mentioned above.

As a whole or by scenario, with the message for random access indicating the cell, the cell is able to allow an RA procedure across cells/carriers to gain additional RA opportunities. Additionally or alternatively, as the CBRA procedure may be able to identify an RA purpose for the BS, proper actions may be taken, such as reconfiguring PUCCH-SR resources for the UE in the cell upon reception of the message for RA in a RA-SR event, and thus cell configuration improvement may be supported by the UE. Thereby, benefits such as reduced user waiting time, and better responsiveness is provided.

Figure 6:
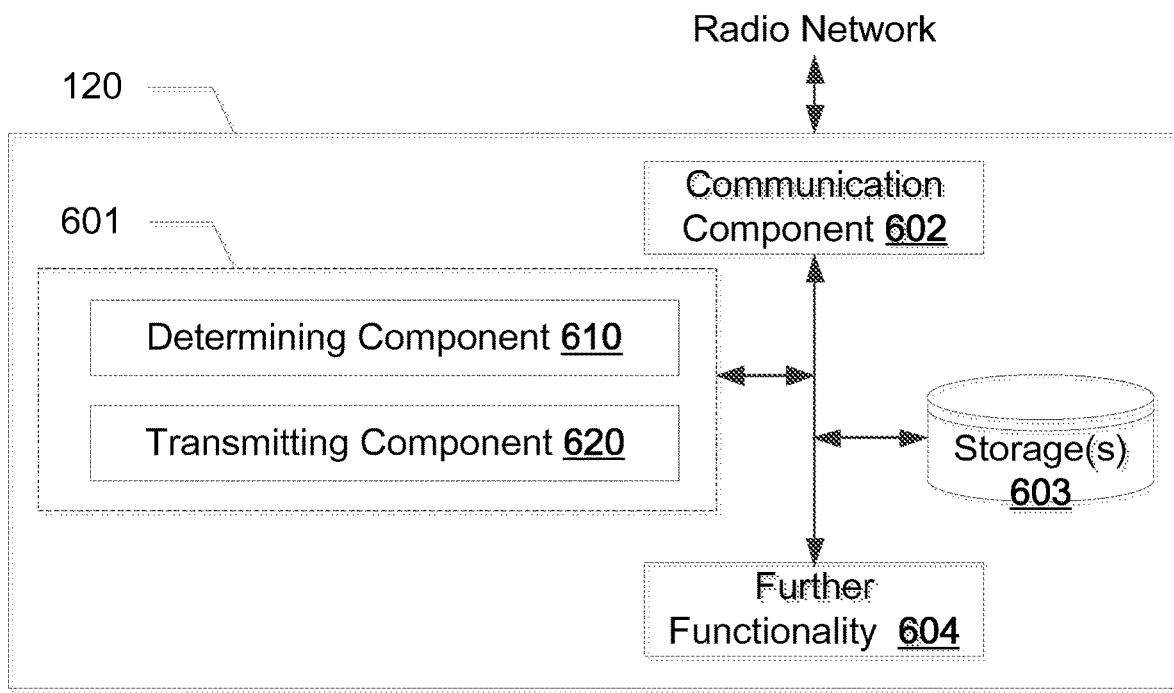
FIG. 6 illustrates a schematic block diagram of a UE 120 according to embodiments of the present disclosure.

FIG. 6 is a schematic block diagram of a UE 120 according to embodiments of the present disclosure. UE 120 is configured to perform random access to a network. The network here may be a 5G network, or any other appropriate radio network.

The part of UE 120 which is most affected by the adaptation of the herein described method, e.g., a part of the method 400 and/or 400', is illustrated as an arrangement 601, surrounded by a dashed line. The UE 120 and arrangement 601 may be further configured to communicate with other entities via a communication component 602 which may be regarded as part of the arrangement 601 (now shown). The communication component 602 comprises means for radio communication. The arrangement 601 or UE 120 may further comprise a further functionality 604, such as functional components providing regular UE functions, and may further comprise one or more storage(s) 603.

The arrangement 601 could be implemented, e.g., by one or more of: a processor or a microprocessor and adequate software and memory for storing of the software, a Programmable Logic Device (PLD) or other electronic component (s) or processing circuitry configured to perform the actions described above, and illustrated, e.g., in FIGS. 4a and/or 4b. The arrangement 601 of the UE 120 may be implemented and/or described as follows.

Referring to FIG. 6, the UE 120 may comprise a determining component 610 and a transmitting component 620.

The determining component 610 is configured to determine a message for random access indicating a cell where the UE 120 initiates the random access and/or a purpose of the random access.

The transmitting component 620 is configured to transmit the message for random access to the radio network Details on how to indicate the cell have been described with reference to FIGS. 4a and 4b, and will not be reiterated here.

It should be noted that two or more different units in this disclosure may be logically or physically combined. For example, the determining component 610 and the transmitting component 620 may be combined as one single unit.

Figure 7:
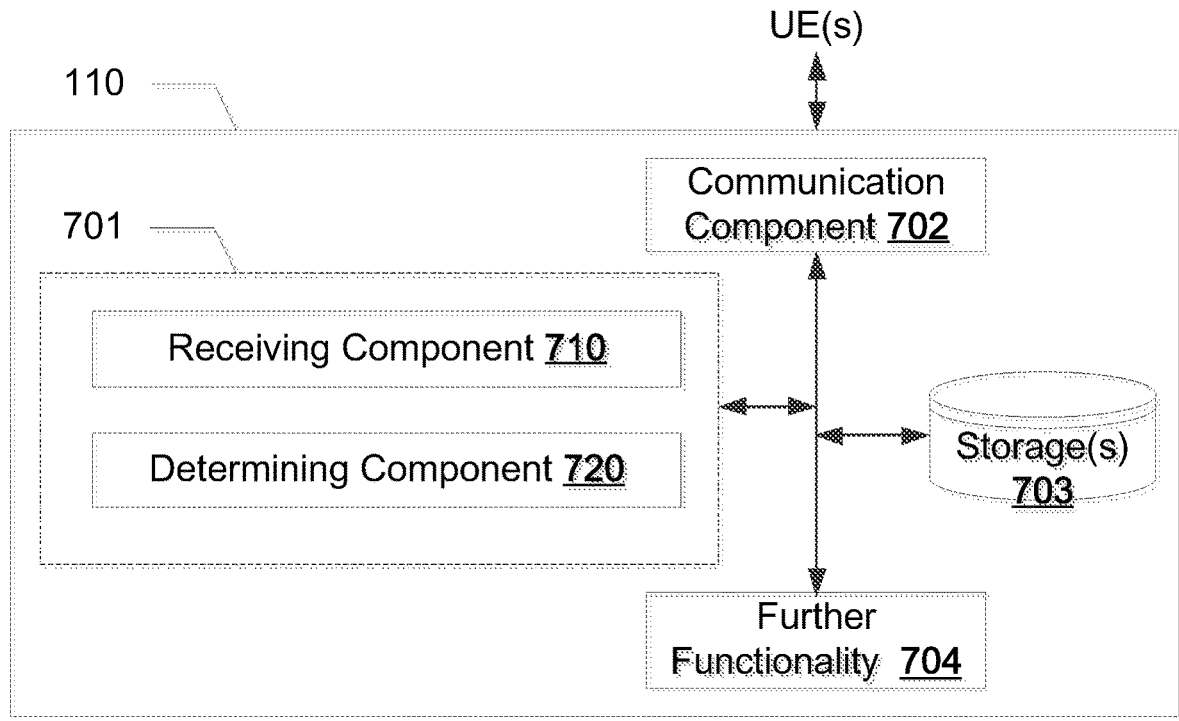
FIG. 7 illustrates a schematic block diagram of a base station 110 according to embodiments of the present disclosure.

FIG. 7 is a schematic block diagram of a base station 110 according to embodiments of the present disclosure. The base station 110 is configured to control random access of one or more user terminals to radio network. The network here may be a 5G network, or any other appropriate radio network.

The part of base station 110 which is most affected by the adaptation of the herein described method, e.g., a part of the method 500 and/or 500', is illustrated as an arrangement 701, surrounded by a dashed line. The base station 110 and arrangement 701 are further configured to communicate with other entities such as UE(s) via a communication component 702 which may be regarded as part of the arrangement 701. The communication component 702 comprises means for radio communication, and may also comprise means for, e.g., wired communication. The arrangement 701 or the base station 110 may further comprise a further functionality 704, such as functional components providing regular base station functions, and may further comprise one or more storage(3) 703.

The arrangement 701 could be implemented, e.g., by one or more of: a processor or a microprocessor and adequate software and memory for storing of the software, a Programmable Logic Device (PLD) or other electronic component (s) or processing circuitry configured to perform the actions described above, and illustrated, e.g., in FIGS. 5a and/or 5b. The arrangement part of the base station 110 may be implemented and/or described as follows.

Referring to FIG. 7, the base station 110 may include a receiving component 710, and a determining component 720.

The receiving component 710 is configured to receive, from the UE 120, a message for random access indicating a cell where the UE 120 initiates the random access, and/or a purpose of the random access.

The determining component 720 is configured to determine the cell where the UE 120 initiates the random access, and/or a purpose of the random access from the message for random access. Details on how to determine the cell have been described with reference to FIGS. 5a and 5b, and will not be reiterated here.

It should be noted that two or more different units in this disclosure may be logically or physically combined. For example, the receiving component 710 and the determining component 720 may be combined as one single unit, e.g., a transceiver in the BS 110.

Figure 8:
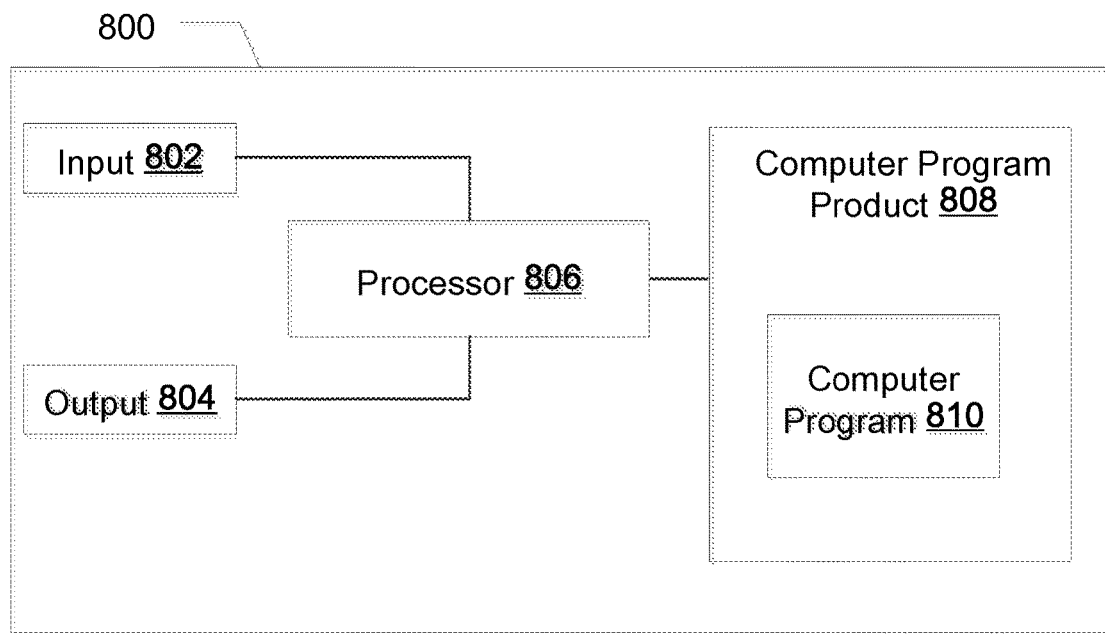
FIG. 8 schematically illustrates an embodiment of an arrangement 800 which may be used in the UE 120 or the base station 110.

FIG. 8 schematically shows an embodiment of an arrangement 800 which may be used in the UE 120 or the BS 110. Comprised in the arrangement 800 are here a processor 806, e.g., with a Digital Signal Processor (DSP). The processor 806 may be a single unit or a plurality of units to perform different actions of procedures described herein. The arrangement 800 may also comprise an input unit 802 for receiving signals from other entities, and an output unit 804 for providing signal(s) to other entities. The input unit and the output unit may be arranged as an integrated entity or as illustrated in the example of FIG. 6 or FIG. 7.

Furthermore, the arrangement 800 comprises at least one computer program product 808 in the form of a non-volatile or volatile memory, e.g., an Electrically Erasable Programmable Read-Only Memory (EEPROM), a flash memory and a hard drive. The computer program product 808 comprises a computer program 810, which comprises code/computer readable instructions, which when executed by the processor 806 in the arrangement 800 causes the arrangement 800 and/or the BS or the UE in which it is comprised to perform the actions, e.g., of the procedure described earlier in conjunction with FIGS. 4a, 4b or FIGS. 5a, 5b.

The computer program 810 may be configured as a computer program code structured in computer program modules. Hence, in an exemplifying embodiment when the arrangement 800 is used in the UE 120, the code in the computer program of the arrangement 800 when executed, will cause the processor 806 to perform the steps as described with reference to FIGS. 4a and/or 4b.

In another exemplifying embodiment when the arrangement 800 is used in the BS 110, the code in the computer program of the arrangement 800 when executed, will cause the processor 806 to perform the steps as described with reference to FIGS. 5a and/or 5b.

The processor 806 may be a single Central Processing Unit (CPU), but could also comprise two or more processing units. For example, the processor 806 may include general purpose microprocessors, instruction set processors and/or related chip sets and/or special purpose microprocessors such as Application Specific Integrated Circuits (ASIC). The processor 806 may also comprise board memory for caching purposes. The computer program 810 may be carried by a computer program product 808 connected to the processor 806. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

As a whole or by scenario, with the message for random access indicating the cell, NR-U UE is able to perform an RA procedure across cells/carriers to gain additional RA opportunities. Additionally or alternatively, as the CBRA procedure may be able to identify an RA purpose for the BS, proper actions may be taken, such as reconfiguring PUCCH-SR resources for the UE in the cell upon reception of the message for RA in a RA-SR event, and thus cell configuration improvement may be supported by the UE. Thereby, benefits such as reduced user waiting time, and better responsiveness is provided.

Figure 9:
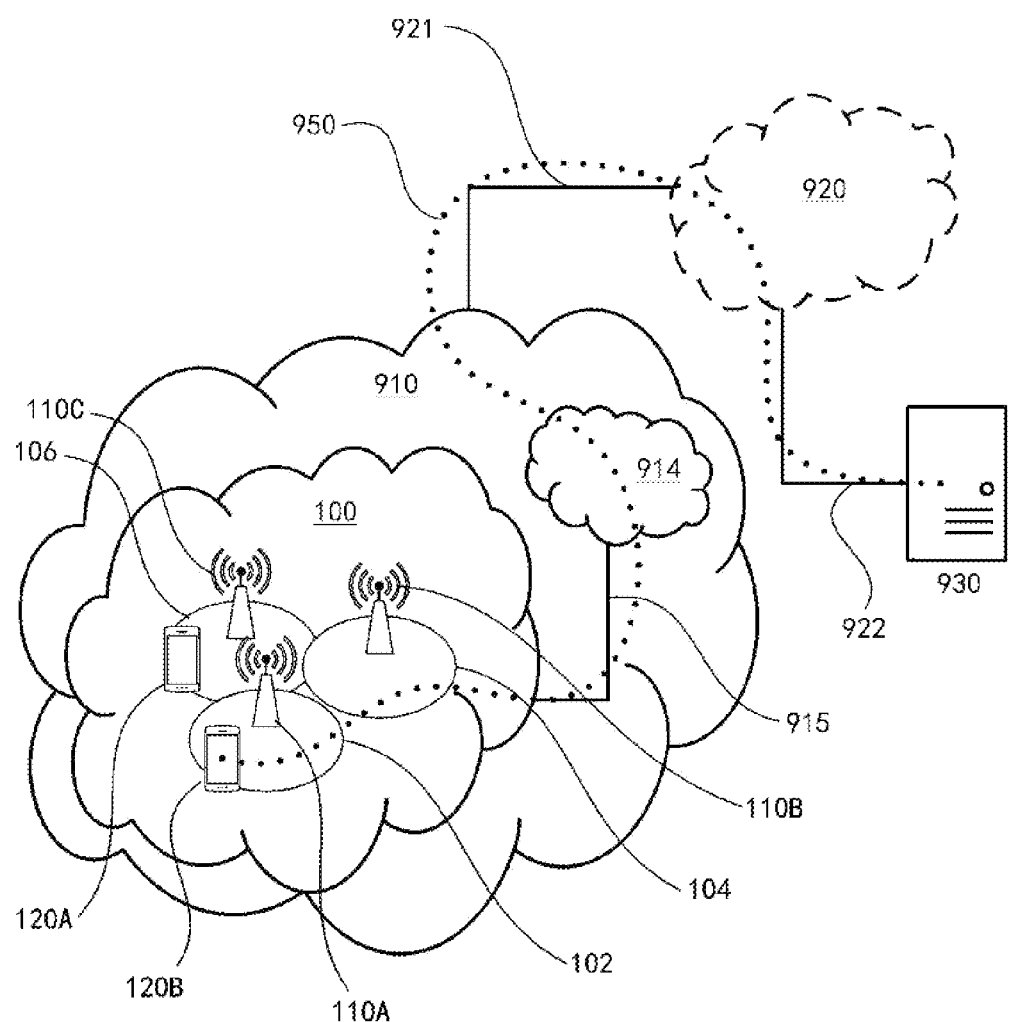
FIG. 9 schematically illustrates a telecommunication network connected via an intermediate network to a host computer.

With reference to FIG. 9, in accordance with an embodiment, a communication system includes a telecommunication network 910, such as a 3GPP-type cellular network, which comprises an access network 100 of FIG. 1, such as a radio access network, and a core network 914. The access network 100 comprises a plurality of base stations 110 A, 110 B, 110 C, such as NBs, eNBs, gNBs or other types of wireless access points, each defining a corresponding coverage area 102, 104,106. Each base station 110 A, 110 B, 110 C is connectable to the core network 914 over a wired or wireless connection 915. A first user equipment (UE) 120 A located in coverage area 106 is configured to wirelessly connect to, or be paged by, the corresponding base station 110 C. A second UE 110 B in coverage area 102 is wirelessly connectable to the corresponding base station 110 A. While a plurality of UEs 120 A, 120 B are illustrated in this example, the disclosed embodiments are equally applicable to a situation where a sole UE is in the coverage area or where a sole UE is connecting to the corresponding base station 110.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. The connections 921, 922 between the telecommunication network 910 and the host computer 930 may extend directly from the core network 914 to the host computer 930 or may go via an optional intermediate network 920. The intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between one of the connected UEs 120 A, 120 B and the host computer 930. The connectivity may be described as an over-the-top (OTT) connection 950. The host computer 930 and the connected UEs 120 A, 120 B are configured to communicate data and/or signaling via the OTT connection 950, using the access network 100, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, a base station 110 may not or need not be informed about the past routing of an incoming downlink communication with data originating from a host computer 930 to be forwarded (e.g., handed over) to a connected UE 120. Similarly, the base station 110 need not be aware of the future routing of an outgoing uplink communication originating from the UE 120 towards the host computer 930.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as a UE 120 connecting via an OTT connection 1050 terminating at the UE 120 and the host computer 1010. In providing the service to the remote user, the host application 1012 may provide user data which is transmitted using the OTT connection 1050.

The communication system 1000 further includes a base station 110 provided in a telecommunication system and comprising hardware 1025 enabling it to communicate with the host computer 1010 and with the UE 120. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with a UE 120 located in a coverage area (not shown in FIG. 10) served by the base station 110. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 110 further includes processing circuitry 1028, which may comprise one or more programmable processors, application-specific integrated circuits, field programmable gate arrays or combinations of these (not shown) adapted to execute instructions. The base station 110 further has software 1021 stored internally or accessible via an external connection.

The communication system 1000 further includes the UE 120 already referred to. Its hardware 1035 may include a radio interface 1012 configured to set up and maintain a wireless connection 1070 with a base station serving a coverage area in which the UE 120 is currently located. The hardware 1035 of the UE 120 further includes processing circuitry 1038, which may comprise one or more programmable processors, application-specific integrated circuits, field programmable gate arrays or combinations of these (not shown) adapted to execute instructions. The UE 120 further comprises software 1031, which is stored in or accessible by the UE 120 and executable by the processing circuitry 1038. The software 1031 includes a client application 1032. The client application 1032 may be operable to provide a service to a human or non-human user via the UE 120, with the support of the host computer 1010. In the host computer 1010, an executing host application 1012 may communicate with the executing client application 1032 via the OTT connection 1050 terminating at the UE 120 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
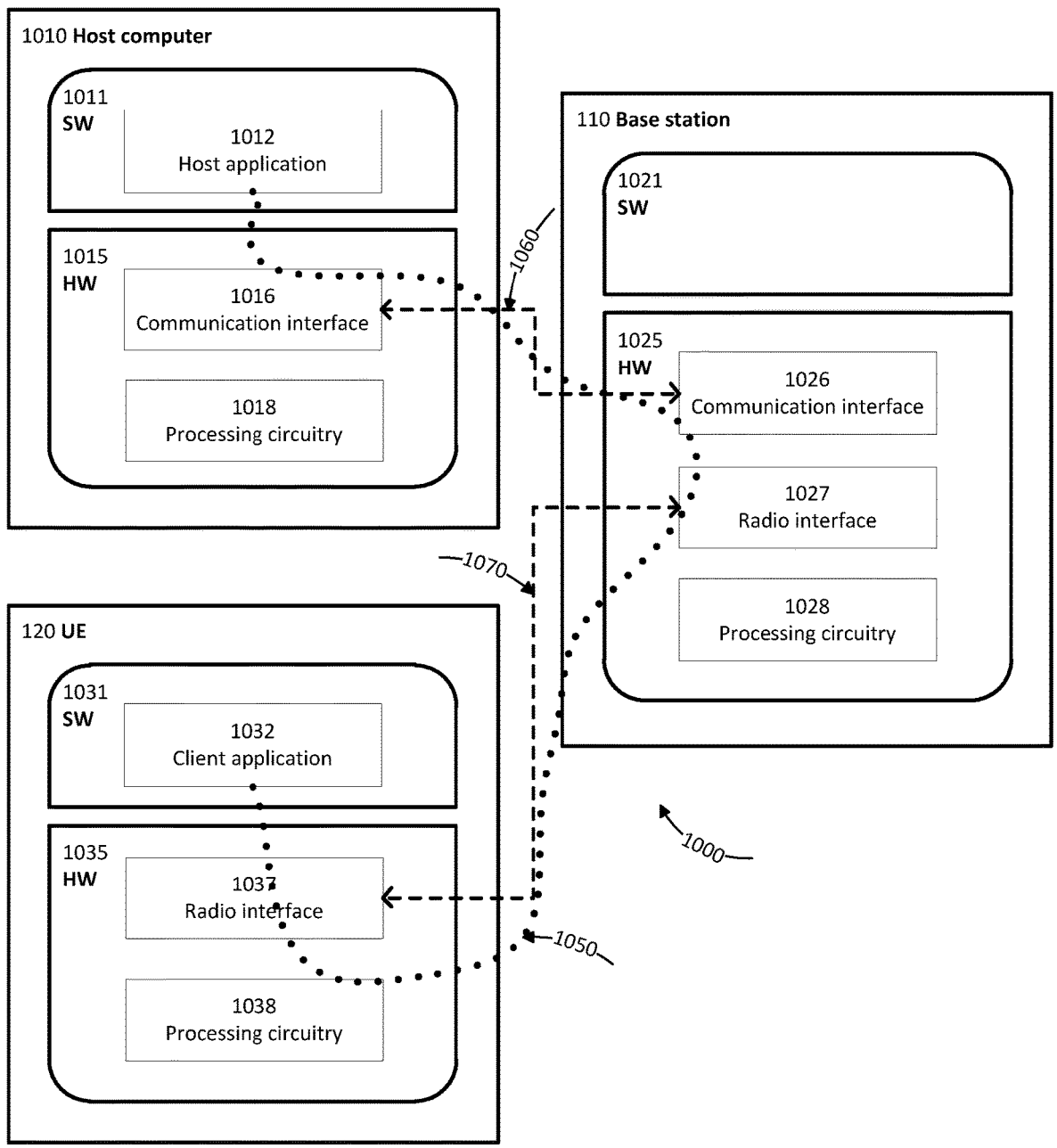
FIG. 10 is a generalized block diagram of a host computer communicating via a base station with a user equipment over a partially wireless connection.

It is noted that the host computer 1010, base station 110 and UE 120 illustrated in FIG. 10 may be identical to the host computer 930, one of the base stations 110 A, 110 B, 110 C and one of the UEs 120 A, 120 B of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the use equipment 120 via the base station 110, without explicit reference to any intermediary devices and the precise routing of messages via these devices. Network infrastructure may determine the routing, which it may be configured to hide from the UE 120 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 120 and the base station 110 is in accordance with the teachings of the embodiments described throughout this disclosure. One or more of the various embodiments improve the performance of OTT services provided to the UE 120 using the OTT connection 1050, in which the wireless connection 1070 forms the last segment. More precisely, the teachings of these embodiments may increase access rate due to support of RA procedure across cells/carriers to gain additional RA opportunities, and also due to improved cell configuration from indication of RA events. Thereby benefits such as reduced user waiting time and better responsiveness are provided.

A measurement procedure may be provided for the purpose of monitoring data rate, latency and other factors on which the one or more embodiments improve. There may further be an optional network functionality for reconfiguring the OTT connection 1050 between the host computer 1010 and UE 120, in response to variations in the measurement results. The measurement procedure and/or the network functionality for reconfiguring the OTT connection 1050 may be implemented in the software 1011 of the host computer 1010 or in the software 1031 of the UE 120, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of the OTT connection 1050 may include message format, retransmission settings, preferred routing etc.; the reconfiguring need not affect the base station 110, and it may be unknown or imperceptible to the base station 110. Such procedures and functionalities may be known and practiced in the art. In certain embodiments, measurements may involve proprietary UE signaling facilitating the host computer's 1010 measurements of throughput, propagation times, latency and the like. The measurements may be implemented in that the software 1011, 1031 causes messages to be transmitted, in particular empty or 'dummy' messages, using the OTT connection 1050 while it monitors propagation times, errors etc.

Figure 11:
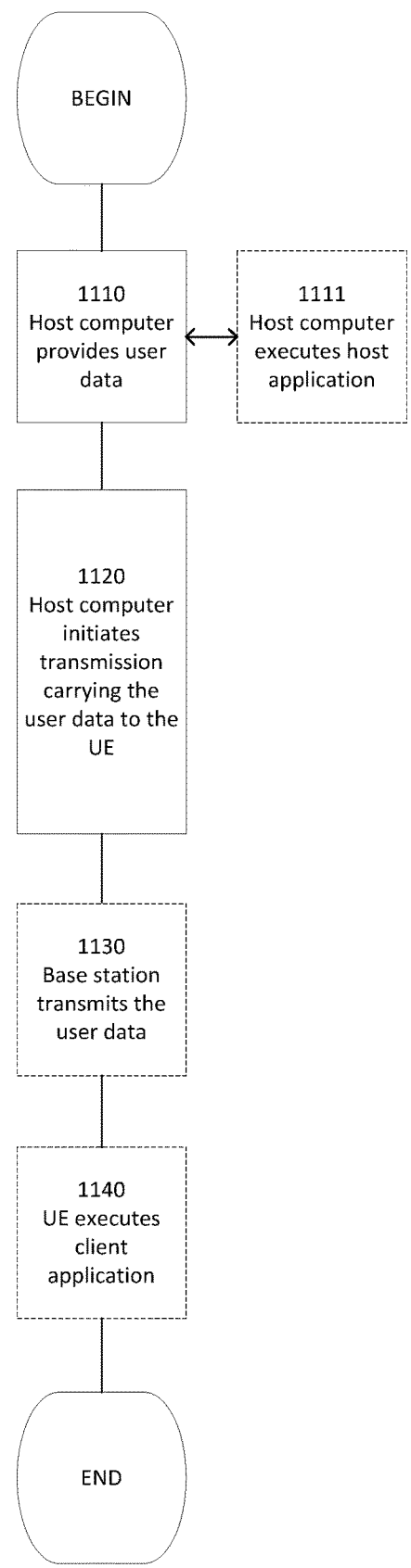
FIGS. 11-14 are flowcharts illustrating methods implemented in a communication system including a host computer, a base station and a user equipment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 1110 of the method, the host computer provides user data. In an optional substep 1111 of the first step 1110, the host computer provides the user data by executing a host application. In a second step 1120, the host computer initiates a transmission carrying the user data to the UE. In an optional third step 1130, the base station transmits to the UE the user data which was carried in the transmission that the host computer initiated, in accordance with the teachings of the embodiments described throughout this disclosure. In an optional fourth step 1140, the UE executes a client application associated with the host application executed by the host computer.

Figure 12:
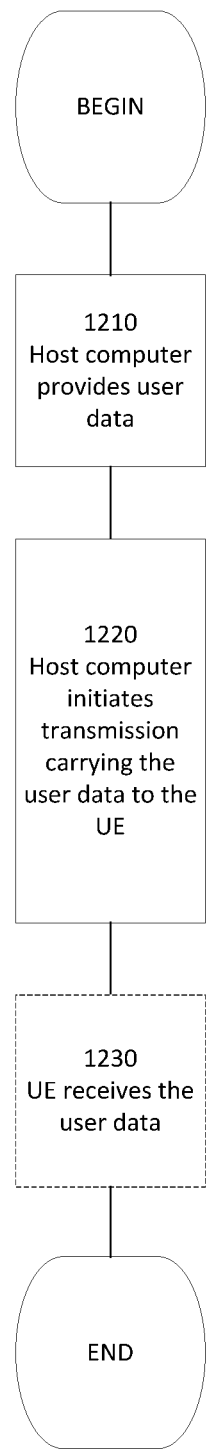

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 1210 of the method, the host computer provides user data. In an optional substep (not shown) the host computer provides the user data by executing a host application. In a second step 1220, the host computer initiates a transmission carrying the user data to the UE. The transmission may pass via the base station, in accordance with the teachings of the embodiments described throughout this disclosure. In an optional third step 1230, the UE receives the user data carried in the transmission.

Figure 13:
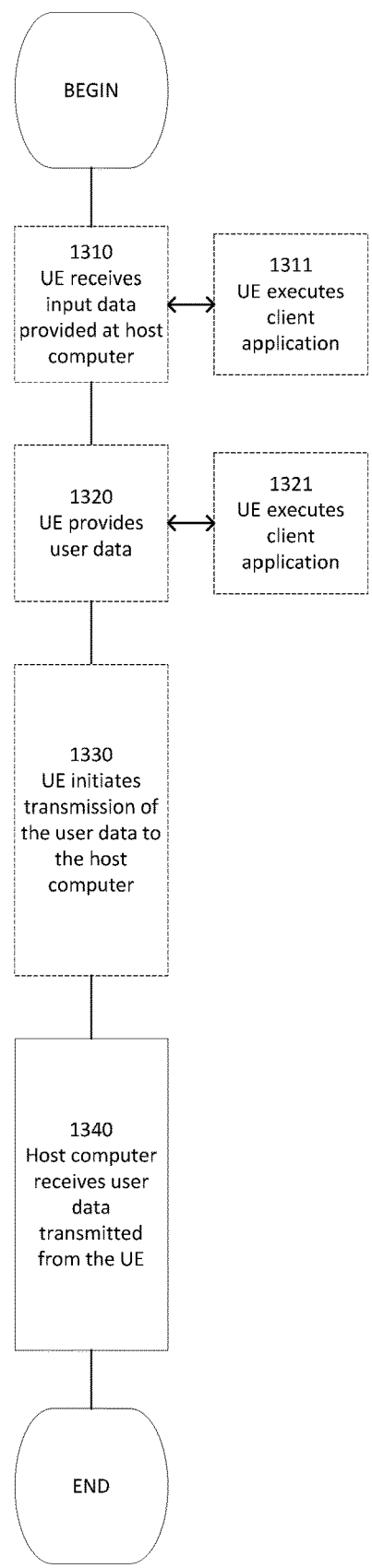

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In an optional first step 1310 of the method, the UE receives input data provided by the host computer. Additionally or alternatively, in an optional second step 1320, the UE provides user data. In an optional substep 1321 of the second step 1320, the UE provides the user data by executing a client application. In a further optional substep 1311 of the first step 1310, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1330, transmission of the user data to the host computer. In a fourth step 1110 of the method, the host computer receives the user data transmitted from the UE, in accordance with the teachings of the embodiments described throughout this disclosure.

Figure 14:
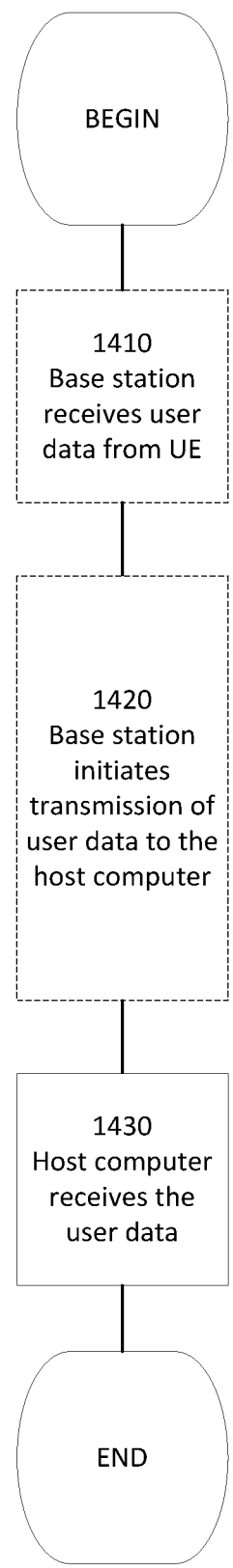

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In an optional first step 1410 of the method, in accordance with the teachings of the embodiments described throughout this disclosure, the base station receives user data from the UE. In an optional second step 1420, the base station initiates transmission of the received user data to the host computer. In a third step 1430, the host computer receives the user data carried in the transmission initiated by the base station.

While the embodiments have been illustrated and described herein, it will be understood by those skilled in the art that various changes and modifications may be made, and equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method for a user equipment, UE, to perform random access to a radio network, the method comprising:
determining at least one message for random access indicating a cell where the UE initiates: the random access, a purpose of the random access, or both;
transmitting, from the UE, the at least one message for random access to a radio network device; and
receiving a response for the at least one message for random access from another network device to which the at least one message was forwarded for random access by the radio network device in response to the cell being not controlled by the radio network device.

2. The method of claim 1, wherein the cell is indicated in a Media Access Control, MAC, Control Element, CE; or
wherein the cell is indicated in a Radio Resource Control, RRC, message comprised in the at least one message for random access; or
wherein the purpose of the random access is indicated in an RRC message comprised in the at least one message for random access.

3. The method of claim 1, wherein the cell is indicated by at least one of: a physical layer cell ID, a global cell ID, a local cell index in a cell group; or
wherein the cell is indicated by an index of Physical Random Access CHannel, PRACH, configuration dedicated for the cell; or
wherein the cell is indicated by a preamble dedicated for the cell comprised in the at least one message for random access, or by a PRACH resource dedicated for the cell on which the at least one message for random access is transmitted.

4. The method of claim 1, wherein the purpose of the random access is indicated by a preamble dedicated for the cell comprised in the at least one message for random access, or by a PRACH resource dedicated for the cell on which the at least one message for random access is transmitted.

5. The method of claim 1, wherein the at least one message for random access further indicates one or more of the following: Quality of Service, parameter on service type, on access category, on access class.

6. The method of claim 1, wherein the at least one message for random access comprises at least one of the first message MSG1 and the third message, MSG3, in 4-step random access procedure, or the first message in 2-step random access procedure.

7. The method of claim 1, further comprising:
providing user data; and
forwarding the user data to a host computer via the transmission to the radio network.

8. A method for a network device to control random access of one or more User Equipments, UEs, to a radio network, the method comprising:
receiving, from a UE, at least one message for random access indicating a cell where the UE initiates: the random access, a purpose of the random access, or both;
determining the cell and/or purpose from the at least one message for random access; and
in response to the cell being not controlled by the network device, forwarding the at least one message for random access to the another network device.

9. The method of claim 8, wherein the cell is determined from a Media Access Control, MAC, Control Element, CE; or
wherein the cell is determined from a Radio Resource Control, RRC, message comprised in the at least one message for random access; or
wherein the purpose of the random access is determined from an RRC message comprised in the at least one message for random access.

10. The method of claim 8, wherein the cell is determined from at least one of: a physical layer cell ID, a global cell ID, a local cell index in a cell group; or
wherein the cell is determined from an index of Physical Random Access CHannel, PRACH, configuration dedicated for the cell; or
wherein the cell is determined from a preamble dedicated for the cell comprised in the at least one message for random access, or from a PRACH resource dedicated for the cell on which the at least one message for random access is transmitted.

11. The method of claim 8, wherein purpose is determined from a preamble dedicated for the cell comprised in the at least one message for random access, or by a PRACH resource dedicated for the cell on which the at least one message for random access is transmitted.

12. The method of claim 8, wherein the at least one message for random access further indicates one or more of the following: Quality of Service, QoS, parameter on service type, on access category, on access class and the method further comprises:
determining one or more of the QoS parameters from the at least one message for random access; and
enhancing the random access to match the one or more of the QoS parameters.

13. The method of claim 8, wherein the at least one message for random access comprises at least one of the first message, MSG1, and the third message, MSG3, in 4-step random access procedure, or the first message in 2-step random access procedure.

14. The method of claim 8, further comprising:
receiving a response for the at least one message for random access from the another network device that controls the cell; and
forwarding the response for the at least one message for random access to the UE.

15. The method of claim 8, further comprising:
receiving information for determining a response for the at least one message for random access from the another network device that controls the cell;
determining the response for the at least one message for random access; and
transmitting the response for the at least one message for random access to the UE.

16. A communication device in a radio network, the communication device comprising:
a storage, adapted to store instructions therein; and
a processor, adapted to execute the instructions to cause the communication device to:
determine at least one message for random access indicating a cell where the User Equipment, UE, initiates: the random access, a purpose of the random access, or both;
transmit, from the UE, the at least one message for random access to a radio network device; and
receive a response for the at least one message for random access from another network device to which the at least one message was forwarded for random access by the radio network device in response to the cell being not controlled by the radio network device.

17. The communication device of claim 16, wherein the cell is indicated in a Media Access Control, MAC, Control Element, CE.

18. The communication device of claim 16, wherein the cell is indicated in a Radio Resource Control, RRC, message comprised in the at least one message for random access.

19. The communication device of claim 16, wherein the purpose of the random access is indicated in an RRC message comprised in the at least one message for random access.

20. The communication device of claim 16, wherein the cell is indicated by at least one of: a physical layer cell ID, a global cell ID, and a local cell index in a cell group.

21. The communication device of claim 16, wherein the cell is indicated by an index of Physical Random Access CHannel, PRACH, configuration dedicated for the cell.

22. The communication device of claim 16, wherein the cell is indicated by a preamble dedicated for the cell comprised in the at least one message for random access.

23. The communication device of claim 16, wherein the cell is indicated by a PRACH resource dedicated for the cell on which the at least one message for random access is transmitted.

24. The communication device of claim 16, wherein the purpose of the random access is indicated by a preamble dedicated for the cell comprised in the at least one message for random access, or by a PRACH resource dedicated for the cell on which the at least one message for random access is transmitted.

* * * * *